US009077002B2

(12) United States Patent
Roe

(10) Patent No.: US 9,077,002 B2
(45) Date of Patent: Jul. 7, 2015

(54) FUEL CELL SYSTEM AND OPERATING METHOD

(75) Inventor: Paul Jonathan Roe, Warwickshire (GB)

(73) Assignee: ALSTOM Technology Ltd, Baden (CH)

( * ) Notice: Subject to any disclaimer, the term of this patent is extended or adjusted under 35 U.S.C. 154(b) by 785 days.

(21) Appl. No.: 12/947,244

(22) Filed: Nov. 16, 2010

(65) Prior Publication Data

US 2011/0117458 A1    May 19, 2011

(30) Foreign Application Priority Data

Nov. 19, 2009 (GB) .................................. 0920237.5

(51) Int. Cl.
| *H01M 8/06* | (2006.01) |
| *H01M 8/04* | (2006.01) |
| *H01M 8/02* | (2006.01) |
| *H01M 8/24* | (2006.01) |
| *H01M 8/12* | (2006.01) |

(52) U.S. Cl.
    CPC ........ *H01M 8/04097* (2013.01); *H01M 8/0252* (2013.01); *H01M 8/243* (2013.01); *H01M 2008/1293* (2013.01); *Y02E 60/50* (2013.01); *Y02E 60/525* (2013.01)

(58) Field of Classification Search
    CPC  H01M 8/0252; H01M 8/04097; H01M 8/243
    See application file for complete search history.

(56) References Cited

U.S. PATENT DOCUMENTS

| 5,733,675 | A  | * | 3/1998  | Dederer et al. ................ 429/425 |
| 6,358,640 | B1 |   | 3/2002  | Kendall et al. |
| 7,482,076 | B2 |   | 1/2009  | Senner et al. |
| 2003/0054210 | A1 | * | 3/2003  | Gillett et al. ..................... 429/13 |
| 2003/0203263 | A1 | * | 10/2003 | Brown et al. .................... 429/31 |
| 2006/0127725 | A9 | * | 6/2006  | Sarkar et al. ..................... 429/31 |
| 2007/0099037 | A1 |   | 5/2007  | Senner |
| 2007/0275282 | A1 | * | 11/2007 | Veyo et al. ....................... 429/26 |
| 2008/0199742 | A1 |   | 8/2008  | MacHuca et al. |

FOREIGN PATENT DOCUMENTS

| EP | 2058885    | 10/2008 |
| WO | 03107463   | 12/2003 |
| WO | 2007075366 | 5/2007  |
| WO | 2007139583 | 6/2007  |
| WO | 2007137068 | 11/2007 |
| WO | 2008123968 | 10/2008 |

* cited by examiner

*Primary Examiner* — Nicholas P D'Aniello

(57) ABSTRACT

A fuel cell system comprises a fuel cell main body containing a fuel cell having an anode side at which fuel is reacted, exhaust products arising at the anode side of the fuel cell as a result of the reaction at the anode side. A recirculation passage is located inside the fuel cell main body and recirculates a proportion of the exhaust products directly to the anode side of the fuel cell for reaction at the anode side. The recirculation passage may include an ejector arrangement for mixing fresh fuel with the recirculated exhaust products and may also include a reforming catalyst for partially reforming the mixture in the recirculation passage.

19 Claims, 4 Drawing Sheets

FUEL CELL SYSTEM AND OPERATING METHOD

CROSS REFERENCE TO RELATED APPLICATION

This application claims priority to United Kingdom Patent Application No. 0920237.5, filed Nov. 19, 2009.

TECHNICAL FIELD

The present disclosure relates to a fuel cell system and an operating method for a fuel cell system. Embodiments of the present disclosure are particularly, but not exclusively, concerned with fuel cell systems which include tubular solid oxide fuel cells (SOFCs) and operating methods for such fuel cell systems.

TECHNICAL BACKGROUND

Fuel cell systems that generate electricity using hydrocarbon fuel typically comprise a plurality of individual fuel cells, each having an anode side and a cathode side, connected in series or parallel to form a fuel cell stack.

FIG. 1 illustrates one example of a conventional fuel cell system comprising a plurality of tubular solid oxide fuel cells (SOFCs) 10, each having an internal anode 12 and an external cathode 14. The tubular fuel cells 10 are located within a fuel cell main body 11.

During operation of the illustrated fuel cell system, at the cathode side (air side) air is supplied to the cathodes 14 through an air inlet 16 and associated air plenum 17 and the air is heated via a heat exchanger 18 before it reaches the air plenum 17. The heated air passes over the cathodes 14 where oxygen is extracted and some waste heat is dissipated. The waste heat is recovered by the heat exchanger 18 as the oxygen-depleted air is exhausted through an air outlet 20, to thereby heat the air supplied through the air inlet 16. At the anode side (fuel side) of the fuel cell system, a suitable hydrocarbon fuel (for example natural gas containing methane) is injected into a steam reformer 22 which is located externally of the fuel cell main body 11, and hence externally of the fuel cell stack. Steam-reformed hydrocarbon fuel containing hydrogen and carbon monoxide is supplied from the external steam reformer 22 to a fuel plenum 24 which supplies the fuel to the internal anodes 12 of the fuel cells 10 through fuel injection passages 25. The steam-reformed fuel is reacted at the surface of each internal anode 12 such that the hydrogen and carbon monoxide is electrolytically oxidized by oxygen ions passing through the fuel cell surface (comprising cathode, electrolyte and anode layers). Exhaust products containing steam, carbon dioxide and unreacted hydrocarbon fuel are formed at the anode side of each fuel cell 10 and are collected in an exhaust plenum 26. A proportion of the exhaust products from the exhaust plenum 26 are recirculated to the external steam reformer 22 via an external ejector 28, which simultaneously injects fresh hydrocarbon fuel into the external steam reformer 22. The recirculated exhaust products provide the steam that is needed for the steam reforming process and the recirculated unreacted fuel increases fuel utilization and, hence, efficiency. The exhaust products that are not recirculated to the external steam reformer 22 may be used to heat the air supplied through the air inlet 16 or may alternatively be vented. The fuel cell stack is typically operated at a temperature in the order of 700 to 1000° C.

Another example of a conventional fuel cell system comprising tubular solid oxide fuel cells (SOFCs) having an alternative configuration with an internal cathode and an external anode is described in WO 2007/139583 (Siemens Power Generation, Inc.) with particular reference to FIG. 1 of that document. The fundamental operating principles of the external anode fuel cell system described in WO 2007/139583 are the same as those of the conventional internal anode fuel cell system described above with reference to FIG. 1 of this specification.

During operation of a fuel cell system, both endothermic and exothermic reactions take place and thermal management is, therefore, important. The conventional fuel cell systems described above do not provide optimal thermal management and it would, therefore, be desirable to provide a fuel cell system with improved thermal management.

SUMMARY OF THE DISCLOSURE

According to a first aspect of the present disclosure, there is provided a fuel cell system comprising:

a fuel cell main body containing a fuel cell having an anode side at which fuel is reacted, exhaust products arising at the anode side of the fuel cell as a result of the reaction at the anode side; and a recirculation passage located inside the fuel cell main body for recirculating a proportion of the exhaust products directly to the anode side of the fuel cell for reaction at the anode side.

According to a second aspect, there is provided an operating method for a fuel cell system comprising a fuel cell main body, the fuel cell main body containing a fuel cell having an anode side and a recirculation passage, the operating method comprising the steps of:

(i) reacting fuel at the anode side of the fuel cell, exhaust products arising at the anode side of the fuel cell, during operation of the fuel cell system, as a result of the reaction at the anode side; and (ii) recirculating a proportion of the exhaust products through the recirculation passage directly to the anode side of the fuel cell for reaction at the anode side.

Due to the location of the recirculation passage inside the fuel cell main body, the recirculation passage receives exhaust products directly from the anode side of the fuel cell and recirculates the exhaust products directly to the anode side of the fuel cell. It is not, therefore, necessary to recirculate and steam-reform exhaust products outside the fuel cell main body as with the conventional fuel cell systems described above. The thermal management of the fuel cell system is thus improved. The fuel cell system is also more compact than the conventional prior art fuel cell systems described above due to the elimination of the external pipe work and external steam reformer.

The recirculation passage may include an ejector arrangement for mixing fresh fuel with the recirculated exhaust products. The ejector arrangement drives the recirculating flow through the recirculation passage.

In some embodiments, the recirculation passage includes a reforming catalyst. The reforming catalyst enables the mixture of fresh fuel and recirculated exhaust products to be partially reformed in the recirculation passage before the partially reformed mixture is recirculated to the anode side of the fuel cell for reaction at the anode side. Further reforming of the partially reformed mixture takes place at the anode side during operation of the fuel cell system.

The recirculation passage is typically located proximate the anode side of the fuel cell. When the recirculation passage includes a reforming catalyst, this arrangement provides improved local thermal management of the fuel cell reaction process since heat produced as a result of the exothermic reaction at the anode side of the fuel cell facilitates the endothermic reforming process that takes place inside the recirculation passage in the presence of the reforming catalyst. The ability to partially reform the mixture of recirculated exhaust products and fresh fuel away from the anode surface of the fuel cell is, however, advantageously maintained. The risk of damage arising at the anode surface is, therefore, minimized due to a reduction in the likelihood of oxidation and stress fractures due to thermal expansion/contraction that arises as a result of the endothermic steam reforming process. There may also be a reduced risk of carbon formation.

The fuel cell main body may contain a single fuel cell. More typically, the fuel cell main body contains a plurality of fuel cells in the form of a fuel cell stack. A plurality of recirculation passages may be located inside the fuel cell main body. The number of fuel cells and recirculation passages inside the fuel cell main body will depend on the particular construction of the fuel cell system. The or each fuel cell may be a solid oxide fuel cell.

The recirculation passage may comprise a recirculation tube and may have an inlet end and an outlet end. This configuration is particularly suitable for use with fuel cell systems in which the fuel cell is a tubular fuel cell.

The recirculation tube may be located outside a tubular fuel cell inside the fuel cell main body. In this case, the tubular fuel cell typically has an external anode and an internal cathode. The recirculation tube may be located inside a tubular fuel cell. In this case, the tubular fuel cell typically has an internal anode and an external cathode. In both arrangements, the tubular fuel cell typically has an open end and a closed end with the recirculation tube extending between the open and closed ends.

When the recirculation tube is located inside a tubular fuel cell having an internal anode and an external cathode, the outlet end of the recirculation tube is generally located at or adjacent to the closed end of the tubular fuel cell. This may assist with the distribution of the recirculated exhaust products over the anode surface at the anode side of the tubular fuel cell.

In some embodiments, the inlet end of the recirculation tube is located generally at or adjacent to the open end of the tubular fuel cell. The recirculation tube thus extends substantially along the entire length of the tubular fuel cell between the open and closed ends thereof. In other embodiments, the inlet end of the recirculation tube is spaced from the open end of the tubular fuel cell. The recirculation tube thus extends only part way along the length of the tubular fuel cell.

In order to provide an operating cycle for the fuel cell system, steps (i) and (ii) of the operating method according to the second aspect of the disclosure may be continuously repeated.

Typically, the exhaust products arising at the anode side of the fuel cell during step (i) additionally contain unreacted fuel. Fuel utilization is thus improved by recirculating and re-using at least a proportion of that unreacted fuel.

Step (ii) may include supplying fresh fuel into the recirculation passage to provide a mixture of recirculated exhaust products and fresh fuel for recirculation directly to the anode side of the fuel cell.

In some embodiments, the method may comprise partially reforming the mixture of recirculated exhaust products and fresh fuel inside the recirculation passage. As mentioned above, this may improve local thermal management of the fuel cell reaction processes, especially when the recirculation passage is located close to the anode side of the fuel cell. Further reforming of the partially reformed mixture takes place at the anode side of the fuel cell.

In other embodiments, reforming of the mixture of recirculated exhaust products and fresh fuel does not take place inside the recirculation passage. Instead, the necessary reforming takes place exclusively at the anode side of the fuel cell.

BRIEF DESCRIPTION OF THE DRAWINGS

Embodiments of the present disclosure will now be described by way of example only and with reference to the accompanying drawings, in which.

DETAILED DESCRIPTION OF SOME PREFERRED EMBODIMENTS

Figure 1:
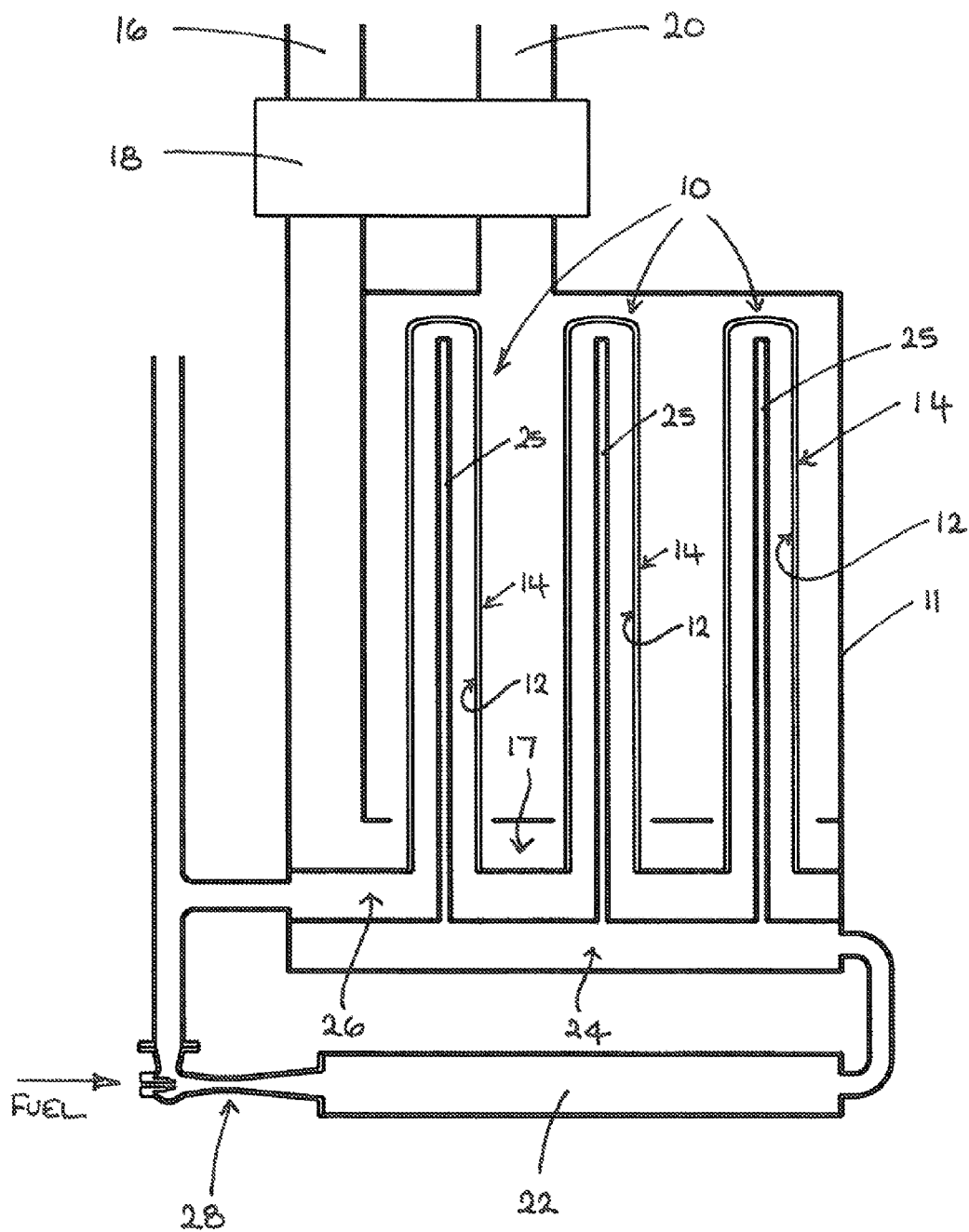
FIG. 1 is a schematic illustration of one example of a prior art internal anode tubular solid oxide fuel cell (SOFC) system.
Figure 2:
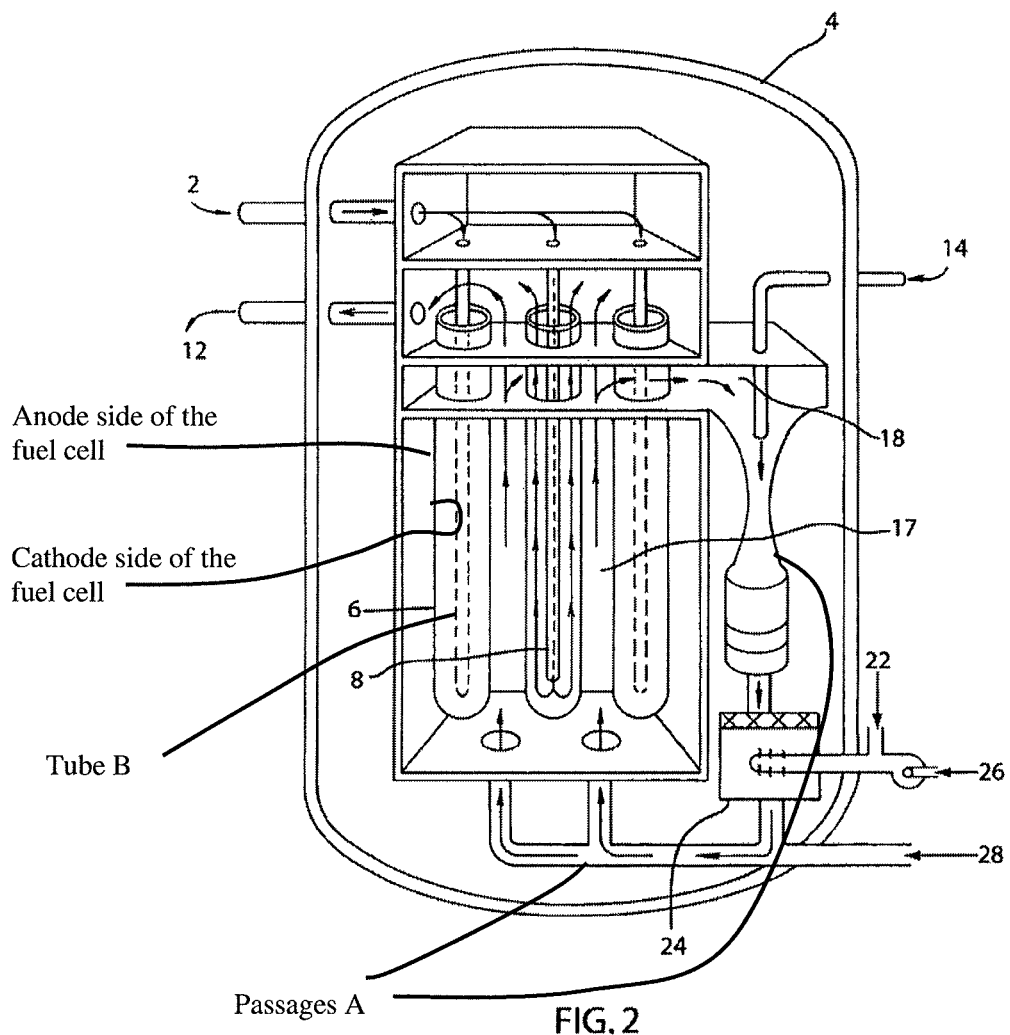
FIG. 2 is diagrammatic cross-sectional view of part of an internal anode tubular fuel cell system according to a first embodiment.

FIG. 2 illustrates part of a fuel cell system comprising a tubular fuel cell 30 having an internal anode surface 32 and an external cathode surface 34, with an electrolyte 36 therebetween. The fuel cell system comprises an air plenum 38 for supplying air to the external cathode surface 34 of the tubular fuel cell 30 and the cathode side of the fuel cell system typically operates in the same way as the prior art fuel cell system described above with reference to FIG. 1. The fuel cell system comprises a fuel cell main body 31 containing the tubular fuel cell 30. Although only one tubular fuel cell 30 is illustrated in FIG. 1, it will be appreciated that the fuel cell system can comprise a plurality of tubular fuel cells 30, in the form of a fuel cell stack, inside the fuel cell main body 31, in a similar arrangement to the fuel cell system described above with reference to FIG. 1.

In accordance with conventional operating principles, a reformed hydrocarbon fuel, such as natural gas containing mostly methane, is reacted at the internal anode surface 32 of the tubular fuel cell 30. The tubular fuel cell 30 includes a recirculation passage 40 having inlet and outlet ends 42, 44 and venturi ejector 46 at the inlet end 42. The recirculation passage 40 is generally tubular so that it conforms to the general shape of the tubular fuel cell 30. In the illustrated embodiment, the tubular recirculation passage 40 includes a reforming catalyst 47 on its inner surface, although it will be understood from the foregoing that the provision of the reforming catalyst 47 is not essential.

In the embodiment of FIG. 2, the recirculation passage 40 extends generally along the full length of the tubular fuel cell 30 between the open and closed ends 48, 50. The inlet end 42 of the recirculation passage 40 is thus located generally at or adjacent to the open end 48 of the tubular fuel cell 30 whilst the outlet end 44 is located generally at or adjacent to the closed end 50.

The fuel cell system includes a fuel injector 52 associated with the tubular fuel cell 30 to supply fresh hydrocarbon fuel to the fuel cell 30. The supplied fuel is partially reformed in the recirculation passage 40 in the presence of the reforming catalyst 47 before it is discharged from the outlet end 44 of the recirculation passage 40 and reacted at the anode surface 32 of the fuel cell 30. As is well understood, exhaust products containing amongst other things steam and unreacted fuel arise at the anode surface 32 of the fuel cell 30 as a result of the reaction.

The exhaust products are driven towards the open end 48 of the fuel cell 30 by the kinetic energy of the fluid flow. The venturi ejector 46 recirculates a proportion of the exhaust products back into the recirculation passage 40, as shown by the arrows 54, whilst the remainder of the exhaust products are discharged into an exhaust plenum 56, as shown by the arrows 58. The recirculated exhaust products and fresh fuel are mixed by the venturi ejector 46 to provide a mixture of the recirculated exhaust products and fresh fuel in the recirculation passage 40.

The steam present in the mixture, as contained within the recirculated exhaust products, facilitates steam reforming of the mixture in the recirculation passage 40 in the presence of the reforming catalyst 47, so that the mixture is partially reformed in the recirculation passage 40. The partially reformed mixture is discharged from the outlet end 44 of the recirculation passage 40 and reacted at the anode surface 32 of the tubular fuel cell 30, with further reforming taking place at the anode surface 32. The exhaust products arising as a result of the reaction again flow towards the open end 48 of the tubular fuel cell 30 where a proportion of the exhaust products are recirculated into the inlet end 42 of the recirculation passage 40 and mixed with fresh fuel by the venturi ejector 46, the remainder of the exhaust products being discharged into the exhaust plenum 56.

Figure 3:
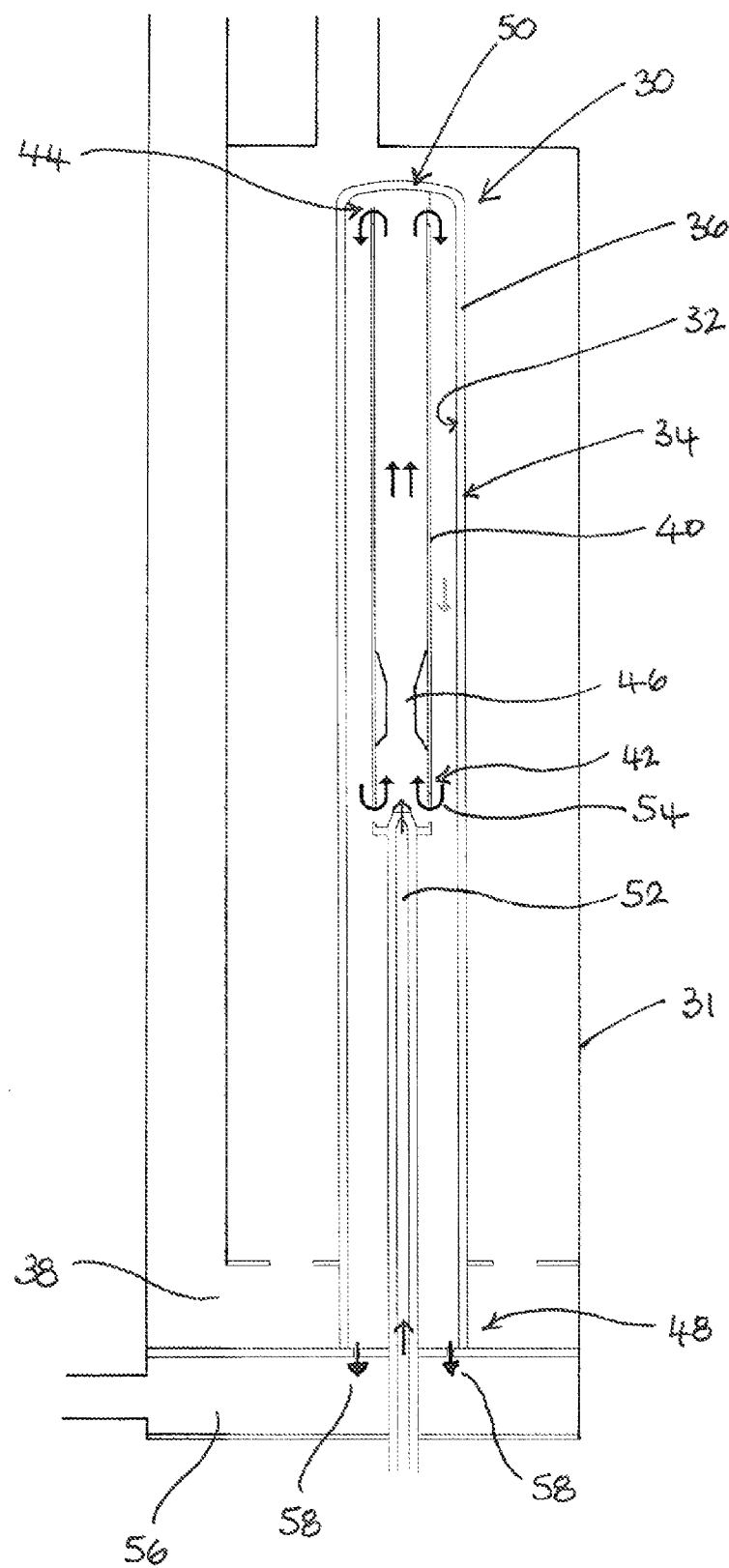
FIG. 3 is a diagrammatic cross-sectional view of part of an internal anode tubular fuel cell system according to a second embodiment.

FIG. 3 illustrates part of an alternative embodiment of a fuel cell system which is similar to the fuel cell system illustrated in FIG. 2 and in which corresponding components are designated using corresponding reference numerals. The construction and principles of operation of the alternative fuel cell system are similar to those described above with reference to FIG. 2. However, in this alternative fuel cell system, the tubular recirculation passage 40 extends only partly along the length of the tubular fuel cell 30. More particularly, the outlet end 44 of the recirculation passage 40 is located generally at or adjacent to the closed end 50 of the tubular fuel cell 30 as in the embodiment of FIG. 2, whilst the inlet end 42 is instead spaced from the open end 48 of the tubular fuel cell 30, being located in the illustrated embodiment at a point approximately midway between the open and closed ends 48, 50 of the tubular fuel cell 30. In this alternative fuel cell system, it will be seen that the fuel injector 52 extends into the tubular fuel cell 30 to thereby inject fuel into the inlet end 42 of the recirculation passage 40.

Figure 4:
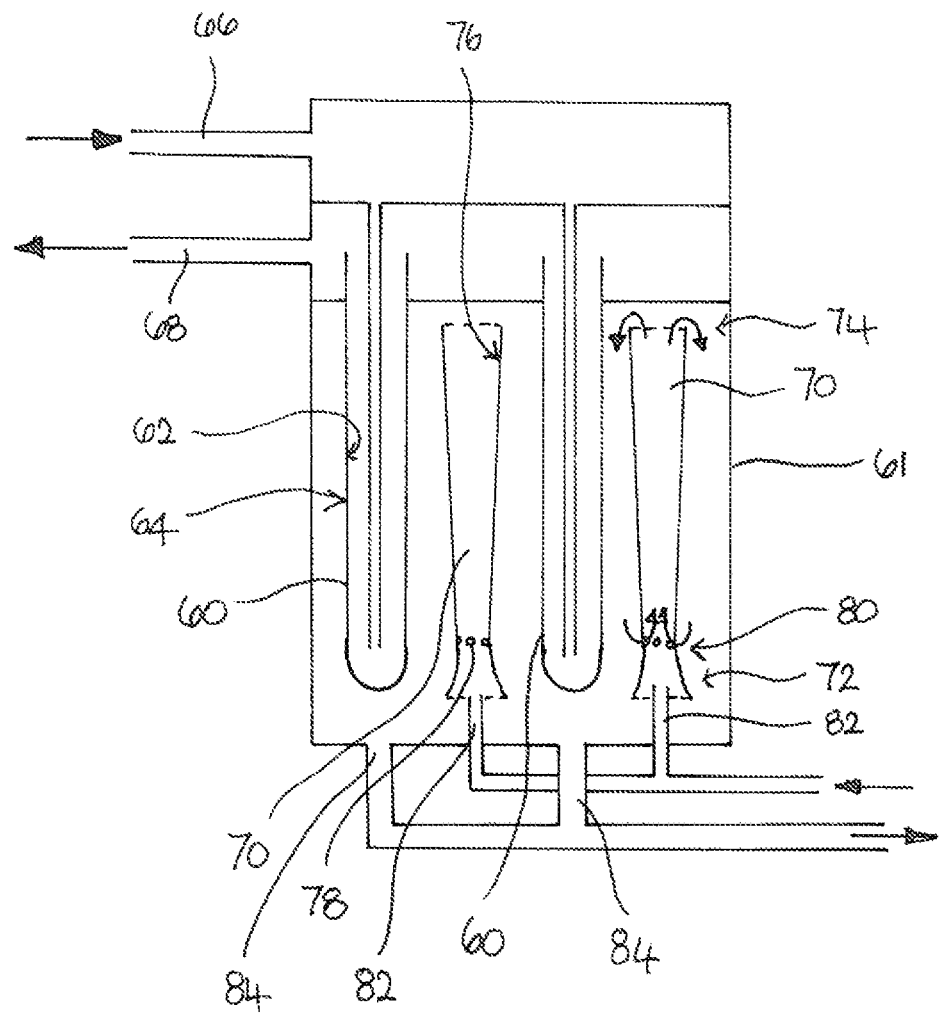
FIG. 4 is a diagrammatic illustration of an external anode tubular fuel cell system according to a third embodiment.

Referring now to FIG. 4, there is shown a diagrammatic illustration of a fuel cell system comprising a fuel cell main body 61 containing a plurality of tubular fuel cells 60, forming a fuel cell stack. Each tubular fuel cell 60 has an internal cathode 62 and an external anode 64, with an electrolyte therebetween. Air is supplied to the internal cathodes 62 of the tubular fuel cells 64 via an air inlet 66 whilst oxygen-depleted air is exhausted from the tubular fuel cells 60 via an air outlet 68 in a conventional manner Fuel is reacted at the external anodes 64 of the tubular fuel cells 60 resulting in the formation of exhaust products containing amongst other things steam and unreacted fuel.

The fuel cell system includes a plurality of tubular recirculation passages 70, each having inlet and outlet ends 72, 74 and including a reforming catalyst 76. The recirculation passages 70 are located inside the fuel cell main body 61, proximate the external anodes 64 of the tubular fuel cells 60. Each recirculation passage 70 also includes recirculation inlet apertures 78 at the inlet end 72 which form part of an ejector arrangement 80. The ejector arrangement 80 recirculates a proportion of the exhaust products from the anode side of the tubular fuel cells 60 into the inlet end 72 of each recirculation passage 70.

A fuel injector 82 injects fresh fuel into the inlet end 72 of each recirculation passage 70 and the ejector arrangement 80 simultaneously recirculates a proportion of the exhaust products arising from the reaction at the external anodes 64 of the tubular fuel cells 60 through the recirculation inlet apertures 78 into the recirculation passages 70. A mixture of fresh fuel and recirculated exhaust products is thus formed in each recirculation passage 70. A proportion of the exhaust gases are discharged from the fuel cell main body 61 via one or more exhaust passages 84. The mixture of fresh fuel and recirculated exhaust products flows along each recirculation passage 70 from the inlet end 72 towards the outlet end 74. The steam present in the mixture, as provided by the recirculated exhaust products, facilitates partial steam reforming of the mixture in each recirculation passage 70 in the presence of the reforming catalyst 76. The partially steam reformed mixture is further reformed at the external anode 64 of each tubular fuel cell 60 and is reacted at the external anode 64 as already described. A proportion of the exhaust products arising at the external anodes 64 are once again recirculated into the recirculation passages 70 as fresh fuel is injected, to thereby provide a continuous operating cycle.

The above embodiments been described purely by way of example, and modifications can be made within the scope of the appended claims. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A fuel cell system comprising:
   a tubular fuel cell having a cathode side, an anode side at which fuel is reacted, and exhaust products arising at the anode side of the fuel cell as a result of the reaction at the anode side; and
   a recirculation passage located inside the tubular fuel cell for recirculating a proportion of the exhaust products directly to the anode side of the tubular fuel cell for reaction at the anode side, the recirculation passage comprising a recirculation tube having inlet and outlet ends located inside the tubular fuel cell.

2. The fuel cell system according to claim 1, wherein the recirculation passage includes a reforming catalyst.

3. The fuel cell system according to claim 1, wherein the recirculation passage includes an ejector arrangement for mixing fresh fuel with the recirculated exhaust products.

4. The fuel cell system according to claim 1, wherein the recirculation passage is located proximate the anode side of the fuel cell.

5. The fuel cell system according to claim 1, wherein the recirculation tube extends between open and closed ends of the tubular fuel cell.

6. The fuel cell system according to claim 5, wherein the outlet end of the recirculation tube is located generally at or adjacent to the closed end of the tubular fuel cell.

7. The fuel cell system according to claim 6, wherein the inlet end of the recirculation tube is located generally at or adjacent to the open end of the tubular fuel cell such that the recirculation tube extends substantially along the entire length of the tubular fuel cell between the open and closed ends.

8. The fuel cell system according to claim 6, wherein the inlet end of the recirculation tube is spaced from the open end of the tubular fuel cell such that the recirculation tube extends only part way along the length of the tubular fuel cell.

9. The fuel cell system according to claim 1, wherein the tubular fuel cell is a single fuel cell.

10. The fuel cell system according to claim 1, wherein the tubular fuel cell is a fuel cell of a fuel cell stack comprising a plurality of fuel cells.

11. The fuel cell system according to claim 10, wherein the fuel cell is a solid oxide fuel cell.

12. The fuel cell system according to claim 1, wherein an entirety of the recirculation passage is defined by the recirculation tube, the recirculation tube being entirely within the tubular fuel cell.

13. The fuel cell system according to claim 12, wherein the recirculation passage extends along a full length of the tubular fuel cell between an open end of the tubular fuel cell and a closed end of the tubular fuel cell.

14. The fuel cell system according to claim 13, wherein the inlet end of the recirculation passage is positioned at or adjacent to the open end of the tubular fuel cell and the outlet end of the recirculation passage is located at or adjacent to the closed end of the tubular fuel cell.

15. The fuel cell system according to claim 14, comprising: a fuel injector positioned to feed fuel to the tubular fuel cell.

16. The fuel cell system according to claim 14, comprising: a fuel injector positioned adjacent to the recirculation passage to feed fuel into the recirculation passage.

17. The fuel cell system according to claim 14, wherein the recirculation passage has a reforming catalyst positioned on an inner surface of the recirculation tube such that fuel from a fuel injector is reformed in the recirculation passage prior to the fuel being ejected from the outlet end of the recirculation passage to react at the anode side of the fuel cell.

18. The fuel cell system according to claim 17, wherein the anode side has an anode surface, the reformed fuel reacting at the anode surface,
wherein the tubular fuel cell has an external cathode surface opposite the anode surface, and
wherein an electrolyte is positioned between the anode surface and the external cathode surface.

19. The fuel cell system according to claim 14, comprising: an ejector positioned adjacent to the open end of the tubular fuel cell, the ejector configured to recirculate the proportion of the exhaust products back into the recirculation passage via the inlet end of the recirculation passage such that, within the recirculation passage, the proportion of the exhaust products mix with fuel fed to the recirculation passage via a fuel injector.

* * * * *